United States Patent
Galloway

(10) Patent No.: US 6,614,617 B1
(45) Date of Patent: Sep. 2, 2003

(54) VOICE COIL MOTOR FORCE CONSTANT CALIBRATION METHOD AND APPARATUS

(75) Inventor: Paul Alexander Galloway, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 427 days.

(21) Appl. No.: 09/209,304

(22) Filed: Dec. 11, 1998

Related U.S. Application Data

(60) Provisional application No. 60/085,882, filed on May 18, 1998.

(51) Int. Cl.[7] ............................................. G11B 5/596
(52) U.S. Cl. .................................................. 360/78.06
(58) Field of Search ................ 318/561, 562; 360/78.09, 78.6, 78.12

(56) References Cited

U.S. PATENT DOCUMENTS

| | | | |
|---|---|---|---|
| 4,480,217 A | * 10/1984 | Robbins et al. | 360/78.06 X |
| 4,697,127 A | * 9/1987 | Stich et al. | 360/78.06 X |
| 4,835,633 A | * 5/1989 | Edel et al. | 360/78.12 |
| 5,363,359 A | * 11/1994 | Lee | 360/78.06 X |
| 5,598,304 A | * 1/1997 | Choi et al. | 360/78.06 X |
| 5,912,782 A | * 6/1999 | Lee et al. | 360/78.09 |

* cited by examiner

*Primary Examiner*—David Hudspeth
*Assistant Examiner*—K. Wong
(74) *Attorney, Agent, or Firm*—Derek J. Berger

(57) ABSTRACT

An information handling system, such as a disc drive, includes a base, a disc stack rotatably attached to the base, and an actuator assembly movably attached to the base. Attached to one end of the actuator assembly is one or more transducers. Attached to the other end of the actuator is a voice coil which forms a portion of a voice coil motor. Magnets attached to the base form the other portion of the voice coil motor. A current driver for the voice coil delivers an amount of current to the voice coil to move the actuator assembly. A force constant is a multiplier applied to the amplifier so that the output current to the voice coil produces a velocity output replicating the designed velocity output. The force constant is determined during the acceleration phase of the movement of the actuator and transducer. A velocity error signal is produced by comparing the actual velocity of the actuator and transducer to the demand velocity. The error signal can be based on one point in time or over a period of time. The selected time is during a linear mode of the current driver.

12 Claims, 5 Drawing Sheets

VOICE COIL MOTOR FORCE CONSTANT CALIBRATION METHOD AND APPARATUS

RELATED APPLICATION

This application claims the benefit of U.S. Provisional Application Ser. No. 60/085,882, filed May 18, 1998 under 35 USC119(e).

FIELD OF THE INVENTION

The present invention relates to the field of mass storage devices. More particularly, this invention relates to a method for performing a track to track seek in a disc drive.

BACKGROUND OF THE INVENTION

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disk, and electrical circuitry that is used to write and read data to and from the disk. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disk.

The transducer is typically housed within the slider. The slider is a small ceramic block which is passed over the disc in a transducing relationship with the disk. The small ceramic block, also referred to as a slider, is usually aerodynamically designed so that it flies over the disk. Most sliders have an air bearing surface ("ABS") which includes rails and a cavity between the rails. When the disc rotates, air is dragged between the rails and the disc surface causing pressure, which forces the head away from the disk. At the same time, the air rushing past the depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular fly height. The fly height is the thickness of the air lubrication film or the distance between the disc surface and the transducing head. This film eliminates the friction and resulting wear that would occur if the transducing head and disc were in mechanical contact during disc rotation. In some disc drives, the slider passes through a layer of lubricant rather than flying over the surface of the disk.

Information representative of data is stored on the surface of the memory disk. Disc drive systems read and write information stored on tracks on memory disks. Transducers, in the form of read/write heads attached to the sliders, located on both sides of the memory disk, read and write information on the memory disks when the transducers are accurately positioned over one of the designated tracks on the surface of the memory disk. The transducer is also said to be moved to a target track. As the memory disc spins and the read/write head is accurately positioned above a target track, the read/write head can store data onto a track by writing information representative of data onto the memory disk. Similarly, reading data on a memory disc is accomplished by positioning the read/write head above a target track and reading the stored material on the memory disk. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

The actuator assembly is moved by a voice coil motor ("VCM"). Attached to the actuator arm of the actuator assembly is a coil, most commonly known as a voice coil. The voice coil is one of the major portions of the VCM. Magnets attached to the base of the disc drive form the other major portion of the VCM. By controlling the amount and direction of the current passing through the voice coil, the direction and the speed at which the actuator arm can be moved is regulated. Of course, the voice coil does have physical constraints one of which is a maximum current which can be passed through the voice coil for a given supply voltage. When maximum current is passed through the voice coil this is called operating in saturation mode. The amount of current applied to the voice coil during saturation mode is referred to as the saturation current.

When the actuator assembly moves the read/write head from a beginning track radially across the other tracks to a selected target track this is referred to as a seek. Many times seeks are to adjacent tracks. Other times the seeks can span up to 2000–3000 tracks or even more depending on the track density of the drive. Actuator assemblies within disc drives generally accelerate and decelerate during long seeks to keep access times to a minimum. Generally the actuator assemblies follow what is known as a velocity profile during a seek to move the read/write head from a start track to a target track. A velocity profile is a preprogrammed equation or table which lists a desired velocity verses the stopping distance remaining until reaching the target track. The profile velocity value is the highest possible value of velocity the actuator can have at a particular distance so that the actuator can still be decelerated to a stop upon reaching the target track. The amount of deceleration that can be applied to the actuator is a function of many variables including voice coil resistance, file torque constant and power supply voltage. These variables are generally not known for each specific disc drive and as a result, the velocity profile is designed using worst case values to assure that there will always be adequate deceleration capability to stop the read/write head actuator upon reaching the target track.

A typical seek is accomplished by calculating distance left to go to the target track, selecting the velocity from the velocity profile which corresponds to the calculated distance to go, determining the actual actuator velocity and subtracting the actual actuator velocity from the selected velocity obtained from the velocity profile. This value is then multiplied by a gain to give a control current output to the voice coil. The acceleration produced is a function of many factors. Amongst the major factors are the magnetic flux density of the VCM and the environmental operating conditions, such as temperature, of the drive. These parameters vary from disc drive to disc drive.

During the design process of velocity or seek mode, a fixed acceleration constant is used as a reference point to determine optimized seek trajectories resulting in characterized move times and settle times to the target track center for a given seek length. If the acceleration constant deviates away from the reference point chosen during the design phase, seek and settle time characteristics will change. This results in unpredictable move times and will cause either overshooting or undershooting on the position error signal during the settle phase of the seek. At worst case, the seek may not complete successfully at the target track resulting in a seek error. A force constant is a multiplier associated with the gain for the VCM drive current that equalizes the results amongst the disc drives.

A standard technique used throughout the industry is to maintain a fixed acceleration/deceleration for a fixed demand. The way this is achieved is to scale the output current by multiplying the demand by a term called the force constant. For example, if the acceleration constant for a drive is 10% less than the design reference point at 1.0 amps flowing through the VCM, the force constant parameter will increase the VCM current by 10% to 1.1 amps. This will ensure that the accelerations required at the design stage will be met under all conditions. The force constant either reduces or increase the output current to the VCM so that the actual velocity profile of a drive more closely corresponds to the designed velocity profile and so that when a velocity demand is made on a drive, the drive will behave as designed.

Typically, the force constant is calibrated in one of two ways. The first way is to run force constant calibration routines at selected time intervals. The problem associated with this technique is that the input/output interruptions occur which the customer sees as poor performance in the disc drive or the computer in which the disc drive is housed. The second way of calibrating the force constant is in real time. In the past, force constant calibrations in real time were calculated during the deceleration portion of a long seek. For example, the force constant calibrations were made only on seeks of 1000 tracks or more. If a disc drive makes predominantly short seeks, the parameters that affect the force constant may change. The force constant parameter would not change since no long seek would be encountered. The result is that force constant parameter would not be correct and seeks and settle times would be either too short or too long. Seek errors could result.

What is needed is a method for calibrating the force constant for a VCM motor that does not effect the operations of the I/O. What is also needed is a method that can be used to produce real time updates to the force constant so that the force constant is corrected and tracks the changes in the parameters that effect the force constant. The method should also provide for ease of manufacture so that a new system hardware configuration is not needed. The method must also provide for a more robust disc drive which is rugged and stable over time. In other words, the system must be able to last for the life of the drive and provide for a drive that is easier to use as well as being more dependable.

SUMMARY OF THE INVENTION

An information handling system, such as a disc drive, includes a base, a disc stack rotatably attached to the base, and an actuator assembly movably attached to the base. Attached to one end of the actuator assembly is one or more transducers. Attached to the other end of the actuator is a voice coil which forms a portion of a voice coil motor. Magnets attached to the base form the other portion of the voice coil motor. A current driver for the voice coil delivers an amount of current to the voice coil to move the actuator assembly. A force constant is a multiplier applied to the amplifier so that the output current to the voice coil produces a velocity output replicating the designed velocity output. The force constant is determined during the acceleration phase of the movement of the actuator and transducer. A velocity error signal is produced by comparing the actual velocity of the actuator and transducer to the demand velocity. The error signal can be based on one point in time or over a period of time. The selected time is during a linear mode of the current driver.

Also disclosed is a method for calibrating the force constant of a voice coil motor of a disc drive. The voice coil motor is for accelerating and decelerating an actuator. The disc drive includes a power amp driver for providing current to the voice coil motor. The method includes applying current to the voice coil so that the actuator assembly follows a velocity demand profile for a selected portion of the acceleration phase. This accelerates the actuator. The velocity summation error over the selected portion of acceleration time is determined. The velocity summation error over the selected portion of acceleration time is t hen compared to a reference value. The force constant is then determined based on the comparison between the velocity summation error over the selected portion of acceleration time to a reference value.

In one embodiment, the selected portion of the acceleration phase includes a linear mode of the power amplifier or driver. In another embodiment, the velocity error over the selected portion of acceleration time includes integrating the velocity error over the selected time period. The selected time can also be a fixed amount of time or associated with the time required to move the actuator assembly a fixed distance during a seek. In some instances, the velocity error over the selected portion of acceleration time includes comparing the actual velocity to the velocity demand at a single point to determine the velocity error.

Advantageously, the method described for calibrating the force constant for a VCM motor that does not effect the operations of the I/O. Force constants can be calibrated in real time over relatively short seeks to produce real time updates to correct the force constant before the changes in the parameters that effect the force constant cause the value to drift out of calibration. The method requires no new system hardware and can be implemented as a software change to the microcode used to run the disc drive. Since the force constant is less likely to drift out of calibration, the method provides for a more robustly designed disc drive which is more stable over time. The calibration of the force constant lasts over the life of the drive and provides for calibration of the force constant as the electronic components drift during their lives. The disc drive is thus more dependable over its life.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
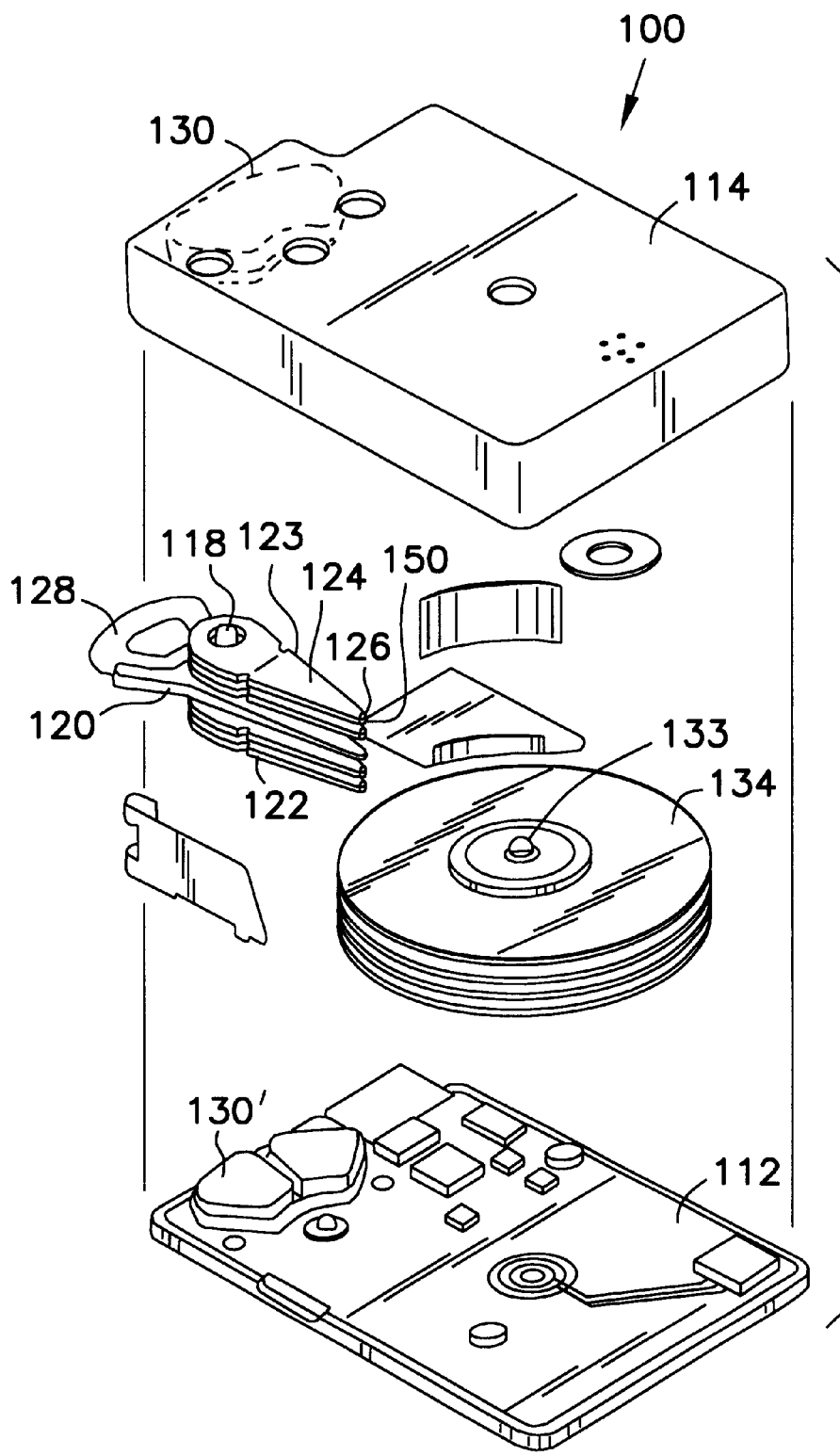
FIG. 1 is an exploded view of a disc drive with a multiple disc stack and a ramp assembly for loading and unloading transducers to and from the surfaces of the disks.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. Also attached to the load spring is a load tang 152. The load tang 152 is used for loading sliders 126 to the disc 134 and unloading the sliders 126 from the disk. On the end of the actuator arm assembly 120 opposite the load springs 124 and the sliders 126 is a voice coil 128.

Attached within the base 112 is a pair of magnets 130. The pair of magnets 130, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of disks 134 are attached to the spindle hub 133. In other disc drives a single disc or a different number of disks may be attached to the hub. The invention described herein is equally applicable to disc drives which have a plurality of disks as well as disc drives that have a single disk.

Figure 2:
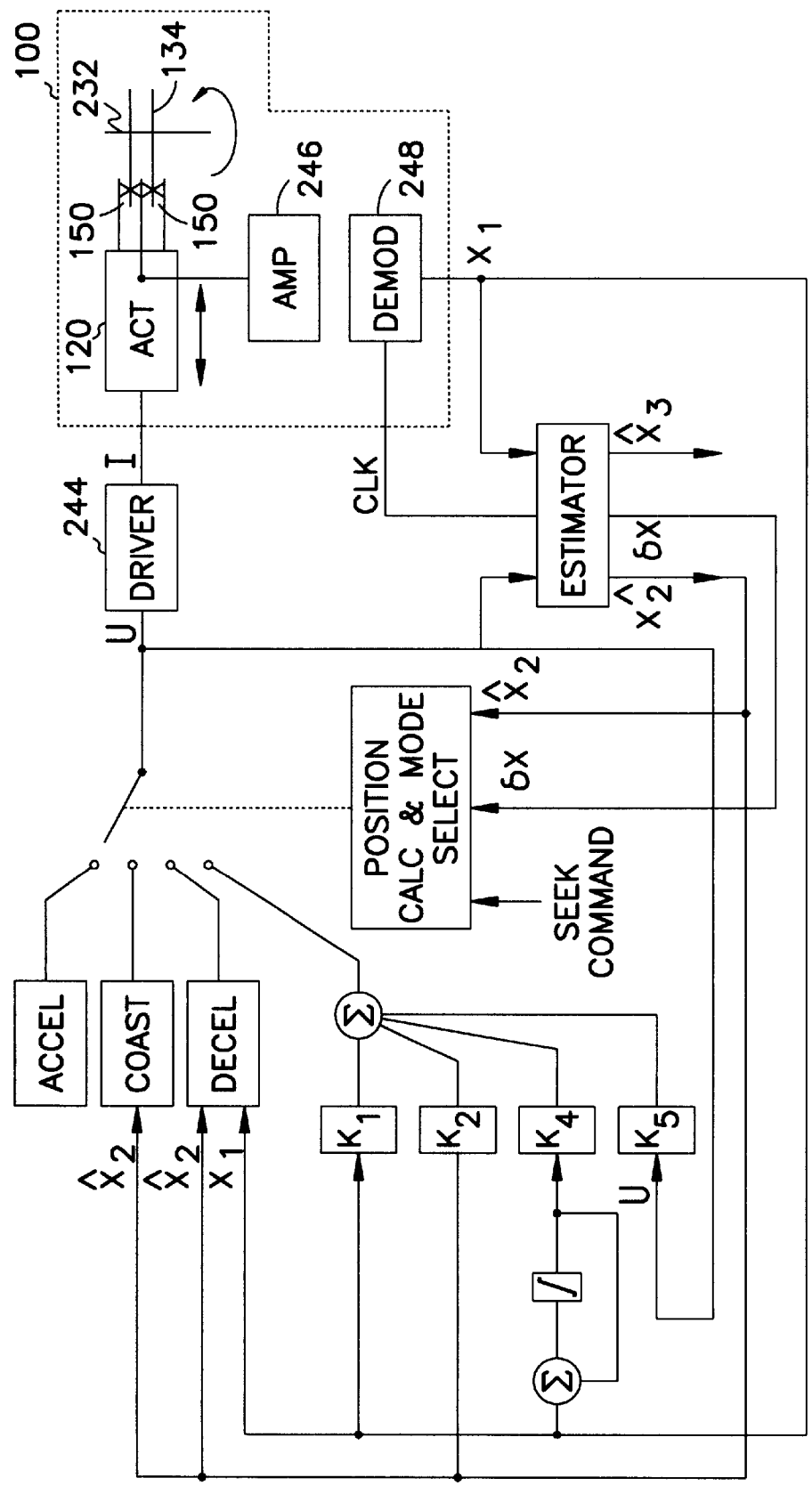
FIG. 2 is a schematic of the actuator arm and the voice coil motor and other portions of the positioning apparatus for the disc drive.

FIG. 2 is a schematic of the actuator arm 123 and the voice coil motor and other components of the transducer positioning system 200 for positioning the transducers of the disc drive. The transducer positioning system 200 for positioning the transducers includes mechanical as well as electrical components. FIG. 2 is a schematic of a transducer positioning system 200 which includes both real mechanical and electrical components and various functional blocks which are implemented in microcode under the control of a microprocessor associated with the disc drive 100. It should be realized that such functional code blocks only exist as modules of code and are not physically separate components.

The disc drive 100 includes both mechanical and electrical components and various electrical circuits. The disks 134 rotate on spindle shaft 232 which is powered by a motor (not shown). Information is written on or read from the disks 134 by magnetic transducers 150 which are within sliders 126 (shown in FIG. 2) and which are positioned by the actuator assembly 120. The actuator assembly 120 moves in response to current from a voltage driver 244 which receives an actuator control voltage signal, U, generated by the microcode.

Disk drives have use servo information to determine position. There are two servo types of servo, namely dedicated servo and sector servo. This invention would be equally applicable to disc drives which use either servo method for determining position of the magnetic transducer 150. The most common type of servo in disc drives these days is sector servo disc drives which have sector servo include servo patterns embedded in each of the disc surfaces which constitute position reference information for the transducer 150 associated with that surface. Signals from the transducer 150 are amplified by amplifier 246 and demodulated by demodulator 248 to produce a position error signal, x1. The signal, x1 is a digital signal which gives the position of a transducer 150 with respect to a particular track. From the position of the servo head, the position of the actuator arm assembly 120 or more accurately, the position of the transducer 150 attached to the arm 126 can be determined. Changes of position at different times give the velocity of the transducer 150.

Figure 3:
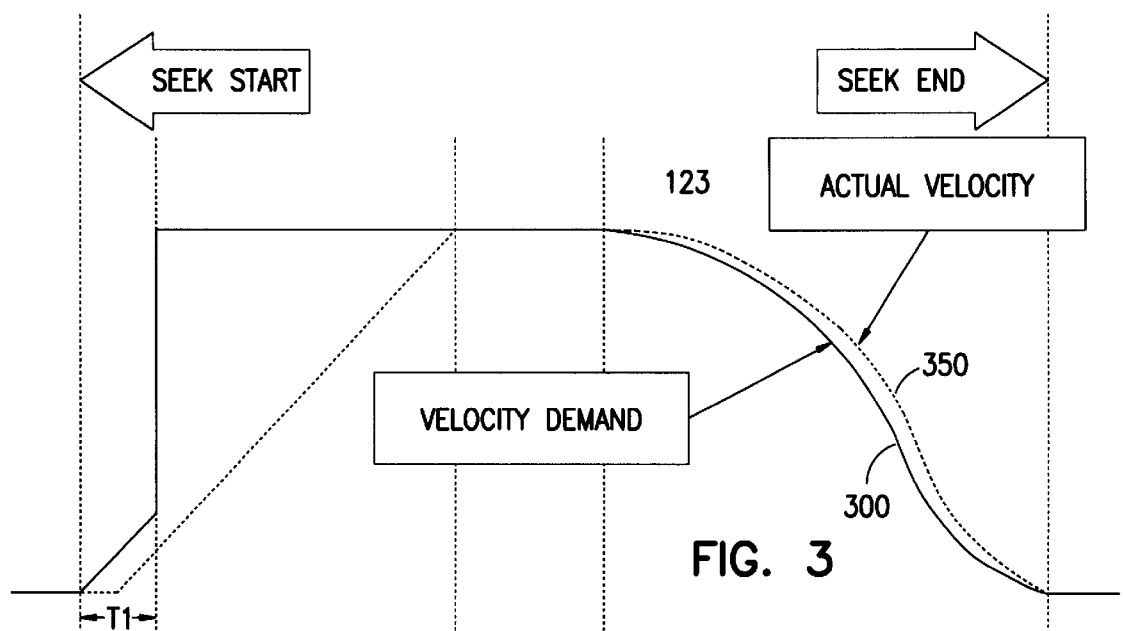
FIG. 3 is a plot showing a demand velocity profile and a plot of actual velocity.

FIG. 3 is a plot of a velocity demand profile 300 for accelerating and decelerating the actuator arm 126 and the transducer 150 attached thereto of the disc drive 100. The velocity demand profile is the ideal plot of velocity with respect to time for a seek of a specific number of tracks for a particular model of disc drive. In FIG. 3, the velocity demand 300 is plotted with respect to time. The velocity demand profile 300 is determined for each particular model of disc drive 100. Each model of disc drive is unique. Within the models, each disc drive has some variance from a reference design point. At the start seek time the velocity is zero. The velocity demand 300 includes an acceleration phase 310 and a deceleration phase 320. Between the acceleration phase 310 and the deceleration phase 320, the velocity stays constant. Some call the portion of the velocity demand profile 300 between the acceleration phase 310 and the deceleration phase 320 the coasting phase. The deceleration of the actuator assembly 120 and the transducer 150 is controlled so that the transducer 150 stops over the center of the target track on the disc 134 with a minimum amount of vibration or ringing. The deceleration is controlled to prevent undershoot or stopping short of the target track and to prevent overshoot or stopping beyond the target track. The velocity should reach a zero value just as the transducer 150 reaches the target track on the disc 134.

Figure 4:
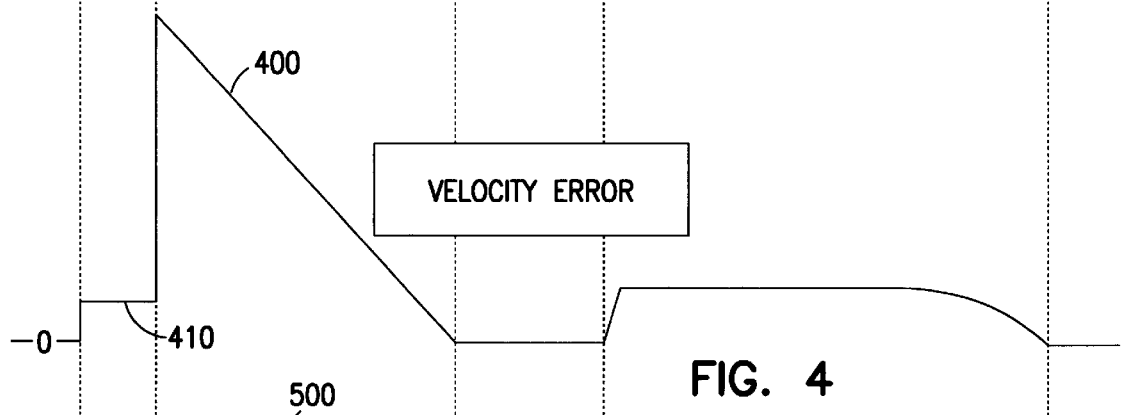
FIG. 4 is a plot showing the velocity error, which is the difference between the velocity demand and the actual velocity at a given time.

Also shown in FIG. 3 is the actual velocity which is depicted by the dotted lines 350. Generally, the actual velocity 350 achieved for a particular seek varies somewhat from the velocity demand profile 300. FIG. 4 is a plot showing the velocity error 400, which is the difference between the velocity demand profile 300 and the actual velocity 350 of the transducer 150 at any given time during the seek.

Figure 5:
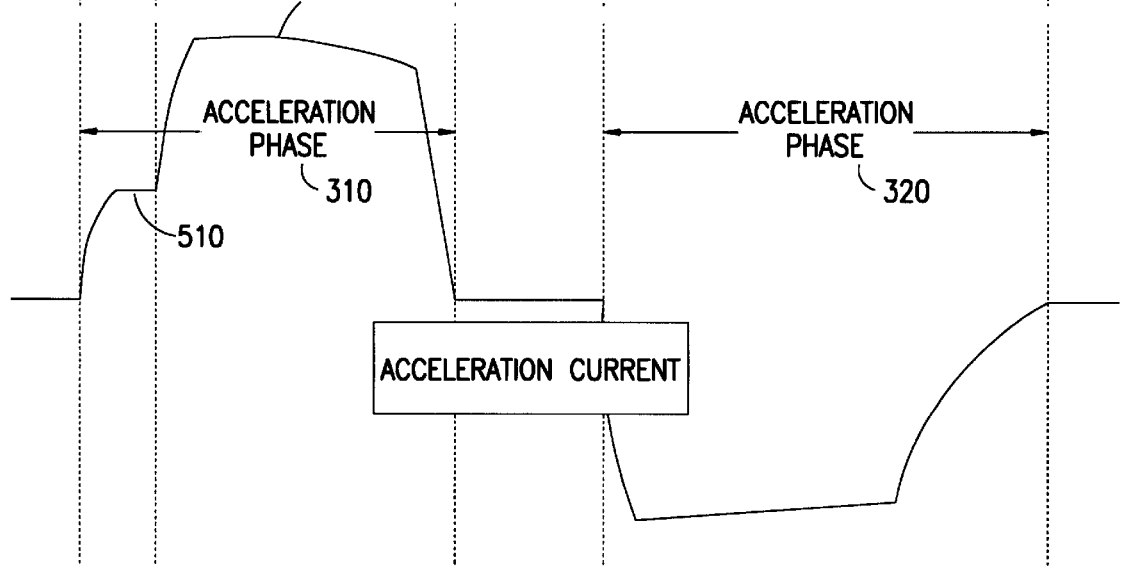
FIG. 5 is a plot shown the acceleration current provided to the power amplifier for driving current in the voice coil.

FIG. 5 is a plot showing the acceleration current 500 provided to the power amplifier or driver 244 over the time of the seek. The acceleration current is used to provide current to the voice coil 128 so that the actual velocity closely matches the demand velocity 300. Of particular interest is the acceleration current 510 over the time period T1. Over the time period T1, the output current tracks the demand current. During the time period T1, the power amplifier or current driver 244 operates in the linear mode. Shortly after the time period T1, the velocity error is large. Feedback control attempts to produce a large current and this drives the power amp into saturation mode. In saturation mode, the power amp is producing the maximum amount of power possible. The finite voltage across the voice coil 128 prevents the power amplifier from amplifying further. In the saturation mode, there is no further amplification produced for increased amounts of current added to the power amplifier or driver 244.

Also of particular interest is the velocity error 410 over the time period T1. The velocity error 410 during the time period T1 is used to determine the force constant for the disc drive 100. The force constant is the result of a standard technique used throughout the industry to maintain a fixed acceleration/deceleration for a fixed demand. The output current to the voice coil 128 is scaled by multiplying the demand by a term called the force constant. For example, if the acceleration constant for a drive is 10% less than the design reference point at 1.0 amps flowing through the VCM, the force constant parameter will increase the VCM current by 10% to 1.1 amps. This will ensure that the accelerations required at the design stage will be met under all conditions. The force constant either reduces or increase the output current to the VCM so that the actual velocity profile of a drive more closely corresponds to the designed velocity demand profile and so that when a velocity demand is made on a drive, the drive will behave as designed.

In order to accurately determine the force constant, the power amplifier or current driver 244 must be operating in a linear mode, such as during the time period T1. The opportunity for calibrating the force constant is limited since the power amplifier 244 only operates in linear mode at certain times during certain seeks. Shortly after the time T1, the power amplifier or driver 244 enters saturation. The power amplifier does not leave saturation until the end of the acceleration phase of the velocity demand profile 310. As the actuator coasts the power amplifier 244 goes into linear mode. In the deceleration phase 320, the power amplifier 244 also operates in the linear mode.

Figure 6:
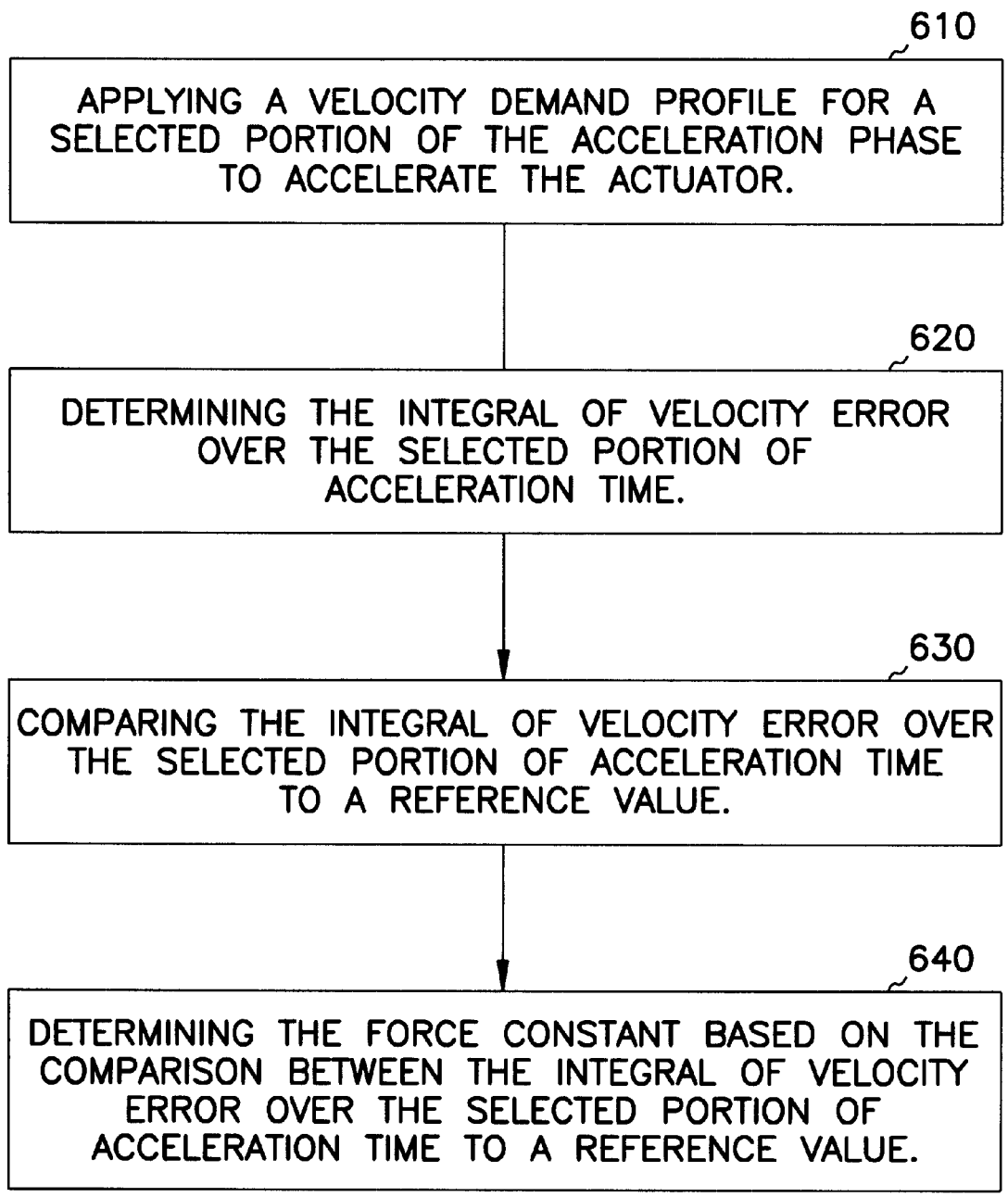
FIG. 6 is a flow diagram of the method for calibrating the force constant.

During the time period T1 during the acceleration phase 310, the force constant is calibrated while the power amplifier or current driver 244 operates in the linear mode. FIG. 6 is a flow diagram of the method for calibrating the force constant.

As shown in FIG. 6 by reference numeral 610, the velocity demand profile is followed for a selected portion of the acceleration phase to accelerate the actuator assembly 120. At the start of a seek, the servo applies the velocity demand trajectory and the power amp drivers 244 remain in a linear mode for the time period T1. In other words, the output current will track the demand current over the time period T1. The velocity error that occurs over the time period T1 is integrated to produce a force constant error. As shown by reference numeral 620, the force constant error is determined over a selected portion of the acceleration time or acceleration phase 310. The force constant error over the selected portion of the acceleration time is then compared to a reference value, as depicted by reference numeral 630. If the force constant error is less than the reference value, the velocity output for a given current input is less than it should be and so the force constant will be over 100%. If the force constant error is more than or positive such that the velocity is greater than the reference value, the velocity generated by a particular current is greater than the reference value and therefore the force constant will be less than 100%. If the force constant error is 0, the force constant is correctly calibrated. The force constant is based on the comparison between the summation of the velocity error over the selected portion of the acceleration time as compared to a reference value, as depicted by reference numeral 640. Once the force constant is calibrated, it can be used to correct the output to the voice coil motor 128 so that it will more accurately reflect the designed parameters of the disc drive model.

Advantageously, by calibrating the force constant based upon the acceleration phase 310 of the velocity demand profile 300 and the velocity error curve 400, the force constant can be recalibrated on any seek that utilizes the demand profile during period T1. This means that the force constant can be calibrated on short seeks (of approximately 20 tracks and above) as well as on long seeks. Thus, the force constant can be recalibrated many times while the environment of the disc drive changes. For example, rather than letting the force constant drift from a correct value, the force constant calibration can be conducted a number of times before the actual acceleration constant gets a chance to drift. In the past, the force constant calibration was only done on long seeks during the deceleration phase 320 of the seek. The problem is that in many computer systems, disc drives are managed so that the number of long seeks are minimized since long seeks equate to long access times. The problem is that a force calibration could drift out of the correct calibration if only short seeks were requested. With this method, a force constant calibration can be made any time a seek is requested that utilizes the demand profile during T1 when the power amplifier 244 is in linear mode.

It should be noted that rather than integrating over a time period T1, the force constant could be derived from a single point in time on the velocity error curve. In other words, the single data point could be used in place of an integral over the time period T1. Similarly, multiple data points over the time period T1 could also be used in place of the integral of the velocity error over the time period T1. Once the velocity error is determined, the force constant error can also be determined. The period T1 could be a fixed time or it could be based upon a fixed distance moved from the start of the seek. In other words, the time period T1 might be associated with a fixed distance over a number of tracks that the transducer moves.

Advantageously, the method described for calibrating the force constant for a VCM motor that does not effect the operations of the I/O. Force constants can be calibrated in real time over relatively short seeks to produce real time updates to correct the force constant before the changes in the parameters that effect the force constant cause the value to drift out of calibration. The method requires no new system hardware and can be implemented as a software change to the microcode used to run the disc drive. Since the force constant is less likely to drift out of calibration, the method provides for a more robustly designed disc drive which is more stable over time. The calibration of the force constant lasts over the life of the drive and provides for calibration of the force constant as the electronic components drift during their lives. The disc drive is thus more dependable over its life.

Figure 7:
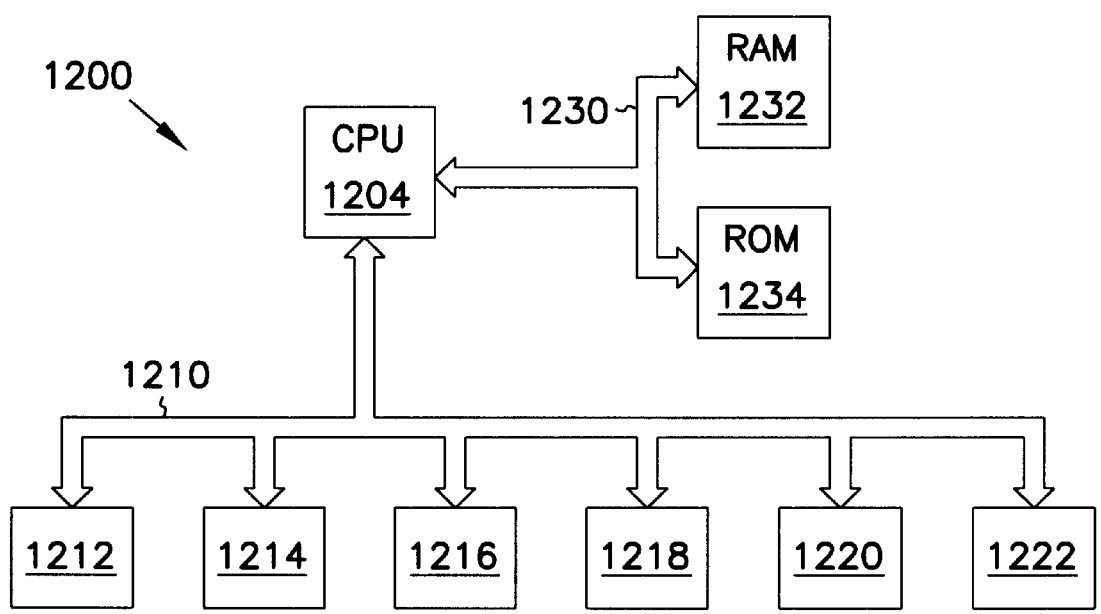
FIG. 7 is a schematic view of a computer system.

FIG. 7 is a schematic view of a computer system. Advantageously, the invention is well-suited for use in a computer system 1200. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The information handling system 1202 includes a disc drive device which includes the ramp described above. The information handling system 1202 may also include an input/output bus 1210 and several devices peripheral devices, such as 1212, 1214, 1216, 1218, 1220, and 1222 may be attached to the input output bus 1210. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a method for calibrating the force constant of a voice coil motor 128, 130 of a disc drive 100 is disclosed. The voice coil motor 128, 130 accelerates and decelerates the actuator 120. The disc drive 100 has a power amp driver 244 for providing current to the voice coil motor 128, 130. The method includes the steps of applying a velocity demand profile 300 for a selected portion of the acceleration phase to accelerate the actuator 610, determining the velocity error 400 over the selected portion of acceleration time 620, comparing the velocity error 400 over the selected portion of acceleration time to a reference value 630, and determining the force constant based on the comparison between the velocity error over the selected portion of acceleration time to a reference value 640. The velocity demand profile 300 is applied for a selected portion of the acceleration phase to accelerate the actuator 610 during a linear mode of the power amp driver 244. In this method, the velocity demand profile 300 may also be applied for a portion of the velocity demand trajectory 310 where the power amp drivers 244 remain in linear mode for a selected time. Determining the velocity error 400 over the selected portion of acceleration time 410 includes integrating the velocity error 400 over the selected time. The the selected time may be a fixed amount of time, or an amount of time associated with moving the actuator assembly 120 a fixed distance during a seek. When determining the velocity error 400 over the selected portion of acceleration time 620, the actual velocity 350 may be compared to the velocity demand 300 at a single point to determine the velocity error 400.

Also disclosed is an information handling system 1000 including a base 112, a disc 134 rotatably attached to the base 112, and an actuator assembly 120 movably attached to the base. The actuator assembly 120 further comprises a voice coil 128 attached to the actuator assembly 120. At least one magnet 130 is attached to the base 112 and positioned near the voice Coil 128 to form a voice coil motor 128, 130. A mechanism determines the amount of current to apply to the voice coil 128 based on a comparison between an actual velocity 350 and a demand velocity 640.

A disc drive 100 also includes a base 112, a disc 134 rotatably attached to the base 112, and an actuator 120 attached to the base 112. One end of the actuator 120 has a transducer 150 and the other end of the actuator 120 has a voice coil 128 which forms a portion of a voice coil motor 128,130. In addition, the disc drive 100 includes a current driver 244 for the voice coil 128 which determines an actual velocity 350 of the actuator 120 and transducer 150, wherein an amount of current delivered to the voice coil 128 is determined, in part, by a force constant determined during an acceleration phase 310 of a movement of the actuator 120 and transducer 150. The current driver 244 is adapted to determine the actual velocity 350 of the actuator 120 and transducer 150 as the actuator accelerates and compares the actual velocity 350 to a target demand velocity 300 of the actuator and transducer as the actuator 120 and transducer 150 accelerates to produce an error signal 400 used to calibrate the force constant. The current driver 244 may also be adapted to determine the difference between the actual velocity 350 of the actuator and transducer as the actuator accelerates, and a target demand velocity 300 of the actuator and transducer as the actuator accelerates to produce an error signal 400 for calibrating the force constant. The current driver 244 may also be adapted to determine the difference by integrating over a selected time. The current driver usually determines the difference during a linear mode of the selected time.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for calibrating the force constant of a voice coil motor of a disc drive, the voice coil motor for accelerating and decelerating an actuator, the disc drive having a power amp driver for providing current to the voice coil motor, the method comprising the steps of:

(a) applying a velocity demand profile for a selected portion of the acceleration phase to accelerate the actuator;

(b) determining the velocity error over the selected portion of acceleration time;

(c) comparing the velocity error over the selected portion of acceleration time to a reference value; and (d) determining a force constant error based on the comparison between the velocity error over the selected portion of acceleration time and a reference value.

2. The method of claim 1 wherein the applying step (a) includes a linear mode.

3. The method of claim 1 wherein the applying step (a) includes a portion of the velocity demand profile where the power amp driver remains in a linear mode for a selected time.

4. The method of claim 1 wherein the determining step (b) includes integrating the velocity error over the selected time.

5. The method of claim 4 wherein the selected time is a fixed amount of time.

6. The method of claim 4 wherein the selected time is an amount of time associated with moving the actuator assembly a fixed distance during a seek.

7. The method of claim 4 wherein the determining step (b) includes comparing the actual velocity to the velocity demand at a single point to determine the velocity error.

8. A disc drive comprising:

a base;

a disc rotatably attached to the base;

an actuator attached to the base, one end of the actuator having a transducer and the other end of the actuator having a voice coil which forms a portion of a voice coil motor; and a current driver for the voice coil which determines an actual velocity of the actuator and transducer, wherein an amount of current delivered to the voice coil is determined, in part, by a force constant error determined by a difference between the actual velocity and a demand velocity during an acceleration phase of a movement of the actuator and transducer.

9. The disc drive of claim 8 wherein the current driver is adapted to determine the actual velocity of the actuator and transducer as the actuator accelerates and compares the actual velocity to a target demand velocity of the actuator and transducer as the actuator and transducer accelerates to produce an error signal used to calibrate the force constant.

10. The disc drive of claim 8 wherein the current driver is adapted to determine the difference between the actual velocity of the actuator and transducer as the actuator accelerates and a target demand velocity of the actuator and transducer as the actuator accelerates to produce an error signal for calibrating the force constant.

11. The disc drive of claim 8 wherein the current driver is adapted to determine the difference between the actual velocity of the actuator and transducer as the actuator accelerates and a target demand velocity of the actuator and transducer as the actuator accelerates to produce an error signal for calibrating the force constant by integrating over a selected time.

12. The disc drive of claim 8 wherein the current driver is adapted to determine the difference between the actual velocity of the actuator and transducer as the actuator accelerates and a target demand velocity of the actuator and transducer as the actuator accelerates to produce an error signal for calibrating the force constant by integrating over a selected time during a linear mode of the selected time.

* * * * *